United States Patent

Honda et al.

[11] Patent Number: 5,456,538
[45] Date of Patent: Oct. 10, 1995

[54] ROLLER BEARING

[75] Inventors: Toshiharu Honda, Fujisawa; Hiroshi Iwasa, Funabashi; Moichi Chiba, Yokosuka; Yasuo Murakami, Hatano; Toshiyuki Yamamoto, Takasaki; Yasuyuki Shimazaki, Annaka, all of Japan

[73] Assignee: NSK Ltd., Tokyo, Japan

[21] Appl. No.: 284,977

[22] Filed: Aug. 4, 1994

[30] Foreign Application Priority Data

Aug. 4, 1993 [JP] Japan .................. 5-211045
Oct. 28, 1993 [JP] Japan .................. 5-270665

[51] Int. Cl.$^6$ .................. F16C 33/58; F16C 33/62
[52] U.S. Cl. .................. 384/569; 384/450; 384/625
[58] Field of Search .................. 384/565, 659, 384/548, 450, 625

[56] References Cited

U.S. PATENT DOCUMENTS 4,893,387  1/1990  Akamatsu et al. .......... 384/565 X
5,064,298  11/1991  Hibi et al. .................. 384/565 X

FOREIGN PATENT DOCUMENTS 117725  5/1991  Japan .................. 384/565
39412  2/1992  Japan .................. 384/569

*Primary Examiner*—Thomas R. Hannon
*Attorney, Agent, or Firm*—Evenson, McKeown, Edwards & Lenahan

[57] ABSTRACT

The surface roughness of the rolling surface 2 of the roller 1 along both the axial and circumferential direction is 0.06 μm RA or less, while the surface roughness of the opposing inner ring raceway 4 is 0.08 to 0.15 μm Ra along the axial direction, and 0.04 or less along the circumferential direction, whereby the heat generated by the roller bearing is kept to a minimum, and the danger of burning of the roller bearing is reduced.

3 Claims, 8 Drawing Sheets

ROLLER BEARING

FIELD OF THE INVENTION

This invention relates to a roller bearing, and in more particular to a roller bearing that, for example, is used in an automatic transmission for automobile, and can be used as a needle-shaped roller bearing.

DESCRIPTION OF THE PRIOR ART

In the rotary support section of a planetary gear mechanism of an automobile automatic transmission there are roller bearings such as a needle-shaped roller bearing (so called "needle bearing") comprising a plurality of rollers and outer and inner rings or races opposed to the rollers. In order to increase the life of these kinds of roller bearings, it is necessary that the areas of linear contact between the rolling surfaces of the rollers and the raceways of the outer and inner rings or races, are well lubricated. Particularly, in the case of the planetary gear mechanism for an automatic transmission, the amount of lubrication oil supplied to the area where the roller bearings are installed is not sufficient and so it is necessary to consider how to improve the lubrication of the aforementioned rolling sections.

Therefore, formerly, the surfaces of the rollers and the raceways were made as smooth as possible, so that metallic contact between the rollers and the mating raceways was prevented even when there was only a little amount of lubrication oil.

By simply making the rolling surfaces of the rollers and the raceways smooth, heat is generated as the rolling surfaces slides frictionally on the raceways, and there is a possibility that, in the worst case, the roller bearing will be seized. In other words, during operation of the roller bearing, there are times when a moment is applied to the rollers in a direction that the center axis of the rollers is made not parallel to the center axis of the mating parts (that is, causing "skew"). When this kind of moment is applied, if the surfaces of the aforementioned rollers and races or rings are simply made smooth, there is hardly any resistance of the rollers to this moment and they become skewed.

If the rollers become skewed, the resistance or friction of each roller to rolling motion becomes much larger than when compared to before becoming skewed, and there is a large increase in heat generated in the area of the roller bearing. In the worst case, there is a possibility that the roller bearing will be seized.

In order to prevent this kind of inconvenient condition caused by the skew of the rollers, approaches have been proposed, for example in Japanese Patent Publication KOKOKU No. 57-61933, where the roughness of the outer raceway is rougher than the roughness of the inner raceway, and the coefficient of friction between the rolling surface of the rollers and the outer raceway is made larger than the coefficient of friction between the rolling surface of the rollers and the inner raceway. However, in this prior art method, the effect of preventing the skew of the rollers is not sufficient, and if the aforementioned moment is large, it is not possible to adequately prevent the skew from occurring, which may lead to the seizure.

SUMMARY OF THE INVENTION

The roller bearing of this invention aims at solving this kind of problem as mentioned above.

The roller bearing of this invention, like the prior art roller bearings, comprises a plurality of rollers having a rolling surface on its outer circumferential surface, and mating parts having raceways on its circumferential surface which come into linear contact with the rolling surface of the rollers.

In more particular, in one feature of the roller bearing of this invention, the surface roughness of the rolling surface of the rollers is 0.06 µm Ra or less along both the axial and circumferential directions, and the surface roughness of the circumferential surfaces of the mating parts is 0.08 to 0.15 µm Ra along the axial direction, and is 0.04 µm Ra or less along the circumferential direction.

In another feature of the present invention, the surface roughness of the rolling surface of the rollers is 0.06 µm Ra or less along both the axial and circumferential directions, the surface roughness of the circumferential surfaces of the mating parts is 0.08 to 0.15 µm Ra along the axial direction, and with reference to the surface roughness in the axial direction of the mating parts, the bearing ratio is 70% or more at 50% of the depth of surface roughness from the crest of the surface roughness.

Figure 1:
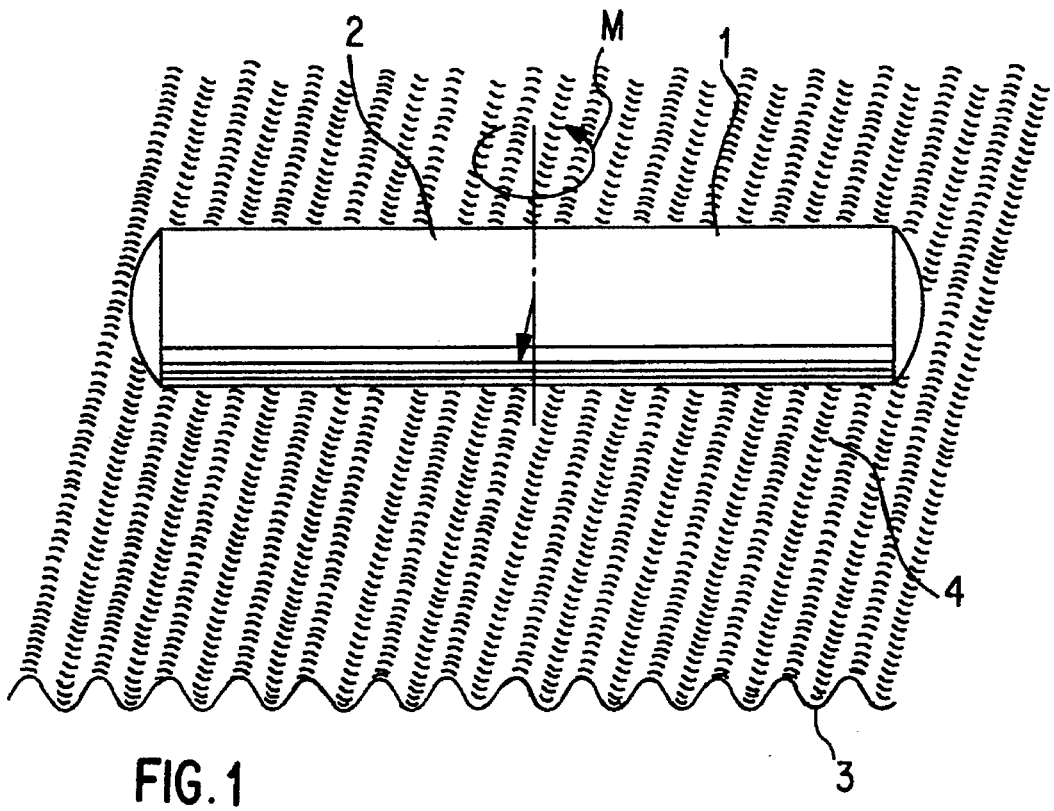
FIG. 1 is a pictorial view showing an embodiment of the roller bearing of this invention.
Figure 2:
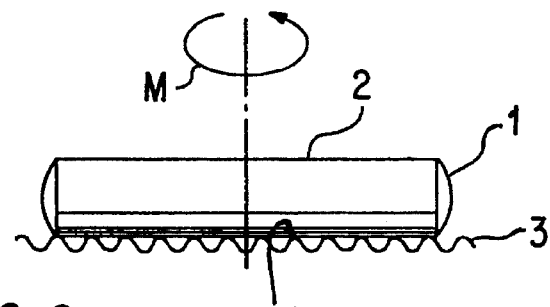
FIG. 2 is the roller bearing of FIG. 1, looking at it from the circumferential direction.
Figure 3:
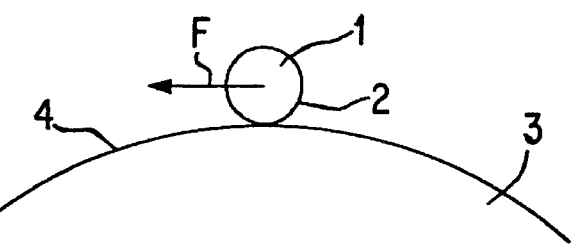
FIG. 3 is the roller bearing of FIG. 1, looking at it from the axial direction.

DETAILED DESCRIPTION OF THE PREFERABLE EMBODIMENTS an embodiment in one feature of the present invention is explained using FIGS. 1 thru 3.

In the roller bearing of this embodiment even if a moment is applied which causes skew of the rollers, a friction force acts between the rolling surfaces of the rollers and the raceways of the mating parts in a direction that prevents the roller skew, and so roller skew disappears.

In FIGS. 1 thru 3, the roller bearing is comprised of a plurality of rollers 1 each having a rolling surface (only one roller is illustrated in FIGS. 1 thru 3) and an inner race or ring 3 having an inner raceway 4 on its outer circumferential surface and constructed such that the skew of the roller 1 is prevented due to the condition of contact between the rolling surface 2 of the roller 1 and the inner raceway 4.

In the roller bearing of this invention in one feature, as is clearly shown in FIGS. 1 thru 3, the surface roughness of the aforementioned inner raceway 4, is comparatively rougher (0.08 to 0.15 μm Ra) along the axial direction (left to right in FIGS. 1 and 2), and it is comparatively smooth (less than or equal to 0.04 μm Ra) along the circumferential direction (left to right in FIG. 3). In other words, the ratio between the surface roughness along the axial direction and the surface roughness along the circumferential direction, that is (surface roughness along axial direction)/(surface roughness along circumferential direction), is 2 or more.

When the roller 1 rolls with the rolling surface 2 in contact with the inner ring raceway 4, which has been formed in this way such that there is a difference between the surface roughness along the axial direction and the surface roughness along the circumferential direction, if a moment M acts in a direction that causes the roller 1 to become skewed, a force acts on the roller 1 in a direction that opposes this moment M and prevents the roller 1 from becoming skewed.

In other words, if there is a tendency for the roller 1 to become skewed, the friction between the aforementioned rolling surface 2 and the inner ring raceway 4 is brought not simply by rolling friction, but by combination of rolling friction and sliding friction. Through this sliding friction, there is a tendency for a friction to cause along the axial direction and circumferential direction between the rolling surface 2 and inner ring raceway 4. In the roller bearing of this invention, because the surface roughness along the axial direction of the inner ring raceway 4 is rougher than the surface roughness along the circumferential direction, the friction force along the axial direction of both surfaces 2 and 4 becomes larger than the friction force along the circumferential direction. Also, due to the comparatively large sliding friction force along the axial direction, a force is generated that acts on the roller 1 in a direction that opposes the aforementioned moment M, and prevents the roller 1 from becoming skewed.

This effect of preventing the roller 1 from becoming skewed can also be obtained in the same way by, in the place of the inner ring raceway 4 (or together with inner ring raceway 4), making the surface roughness of the outer ring raceway, formed on the inside surface of the outer ring or race, comparatively rough (0.08 to 0.15 μm Ra) along its axial direction (left and right in FIGS. 1 and 2), and comparatively smooth (less than 0.04 μm Ra) along its circumferential direction (left and right in FIG. 3).

Figure 4:
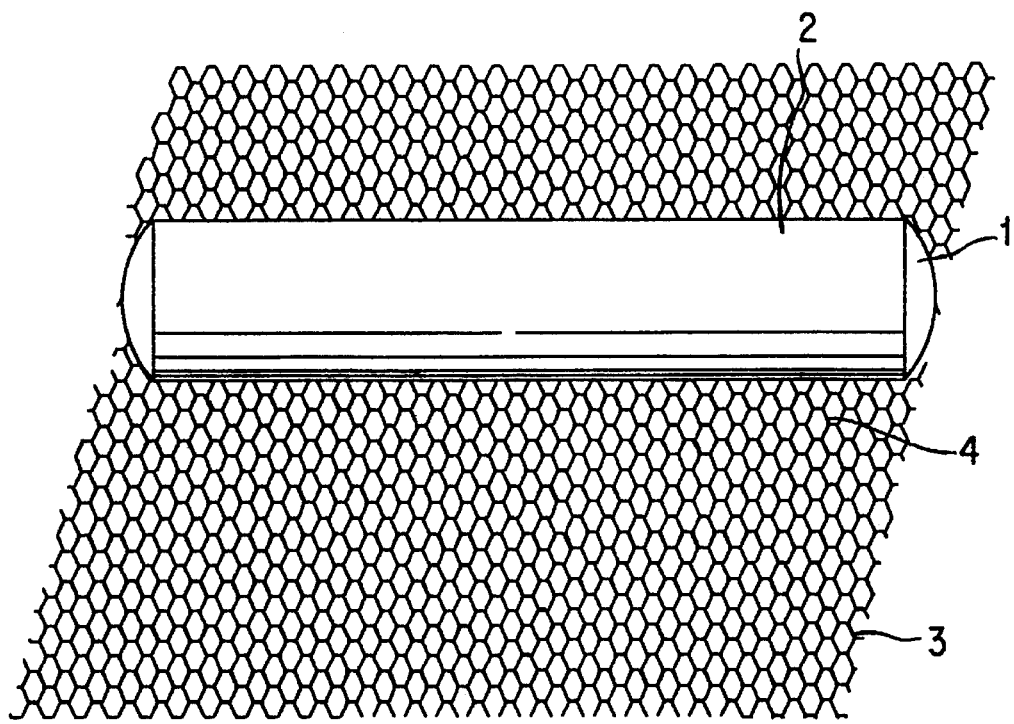
FIG. 4 is a pictorial view showing a prior art roller bearing.
Figure 5:
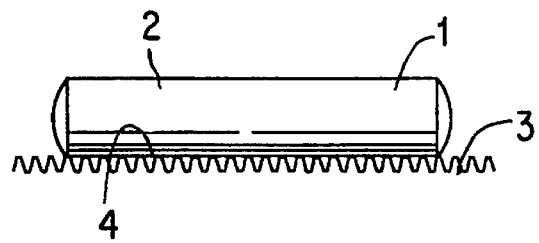
FIG. 5 is the prior art roller bearing of FIG. 4, looking at it from the circumferential direction.
Figure 6:
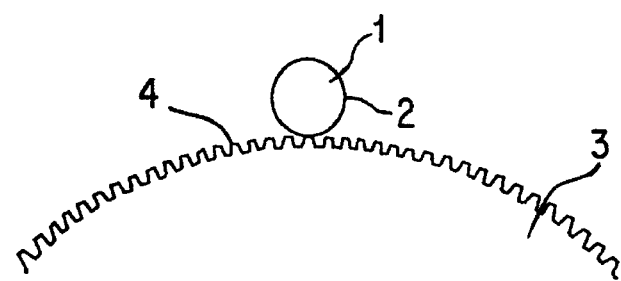
FIG. 6 is the prior art roller bearing of FIG. 4, looking at it from the axial direction.

On the contrary, in the prior art structure as can be seen in FIGS. 4 thru 6 where the surface roughness of the inner ring raceway 4 (or outer ring raceway) is nearly the same in both the axial and circumferential directions, there is not enough force generated in the direction that prevents the roller 1 from becoming skewed, regardless of the fine or rough surface roughness of the inner ring raceway 4. Specifically, if the aforementioned surface roughness is small (smooth) in both the axial and circumferential directions, the friction force enough to generate a force that opposes the skew does not act on either of the aforementioned surfaces 2 and 4, so that it is not possible to prevent the roller 1 from becoming skewed. Also, if the surface roughness is large (rough) in both the axial and circumferential directions, the sliding friction along both the axial direction and circumferential direction becomes large, and due to the friction force along the circumferential direction, the force which returns the skewed roller to its original position disappears, so that the effect of preventing the roller 1 from becoming skewed is lost. Furthermore, if the surface roughness is large along both directions, the lubrication between the aforementioned surfaces 2 and 4 becomes poor, and this causes bad effects on the rolling fatigue, and reduces the life of the roller bearing.

Figure 7:
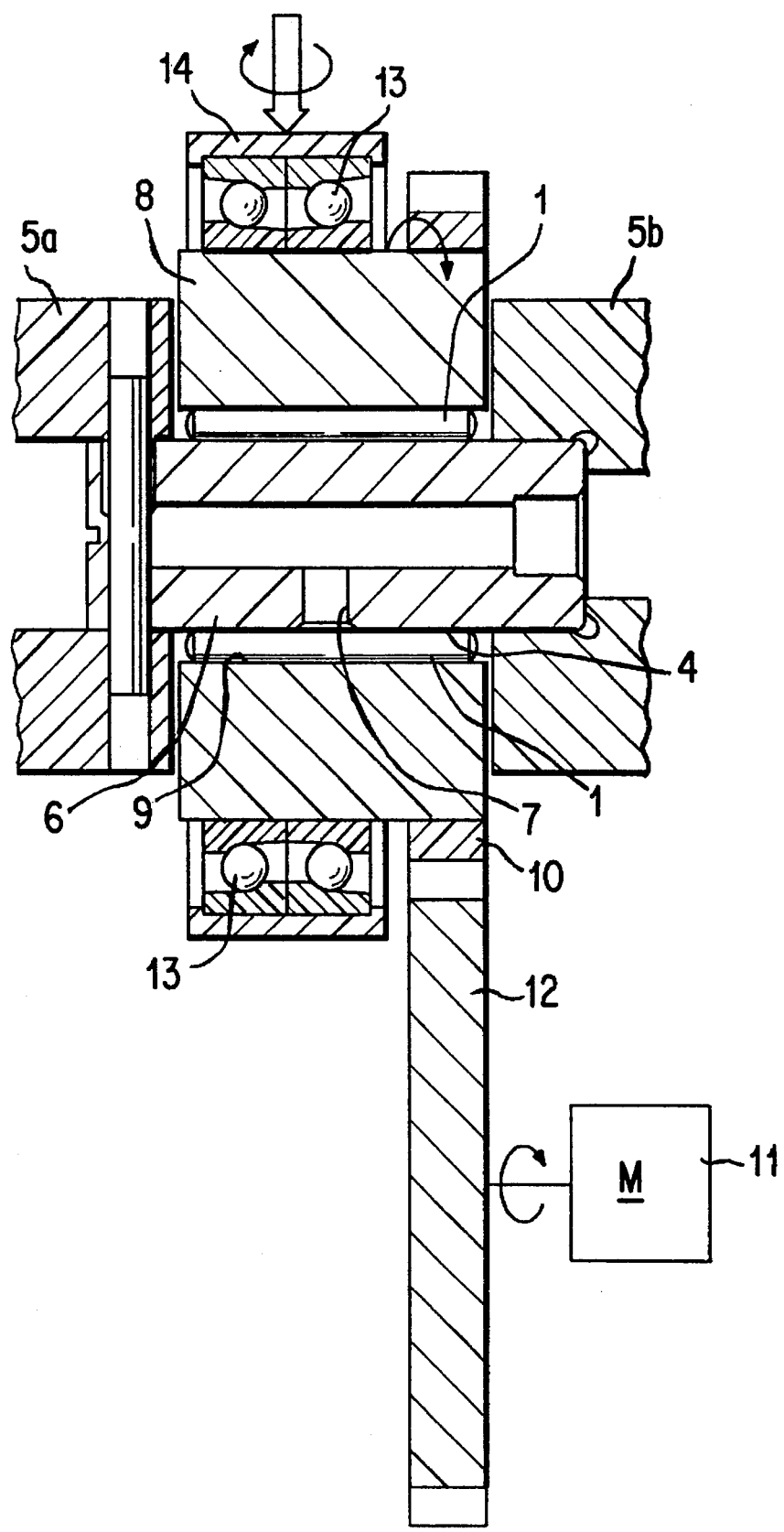
FIG. 7 is a cross-sectional view of the test apparatus used in confirming the effect of this invention.
Figure 8:
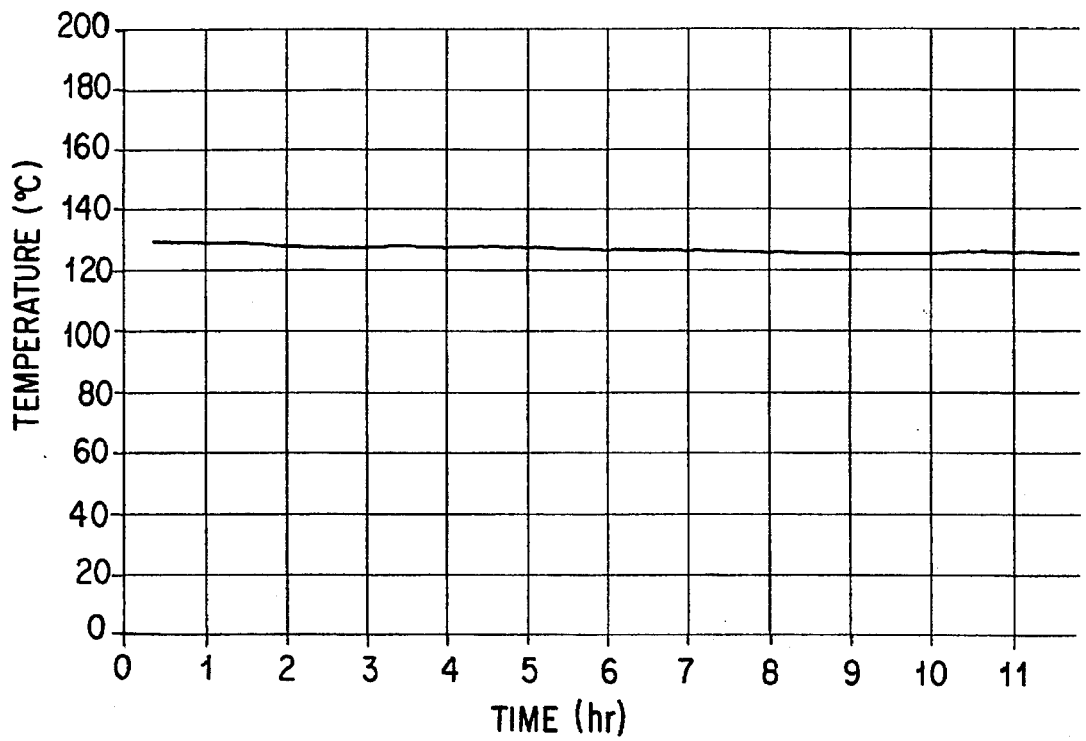
FIG. 8 is a graph showing the change in temperature of the raceway in one embodiment of the roller bearing of this invention.
Figure 9:
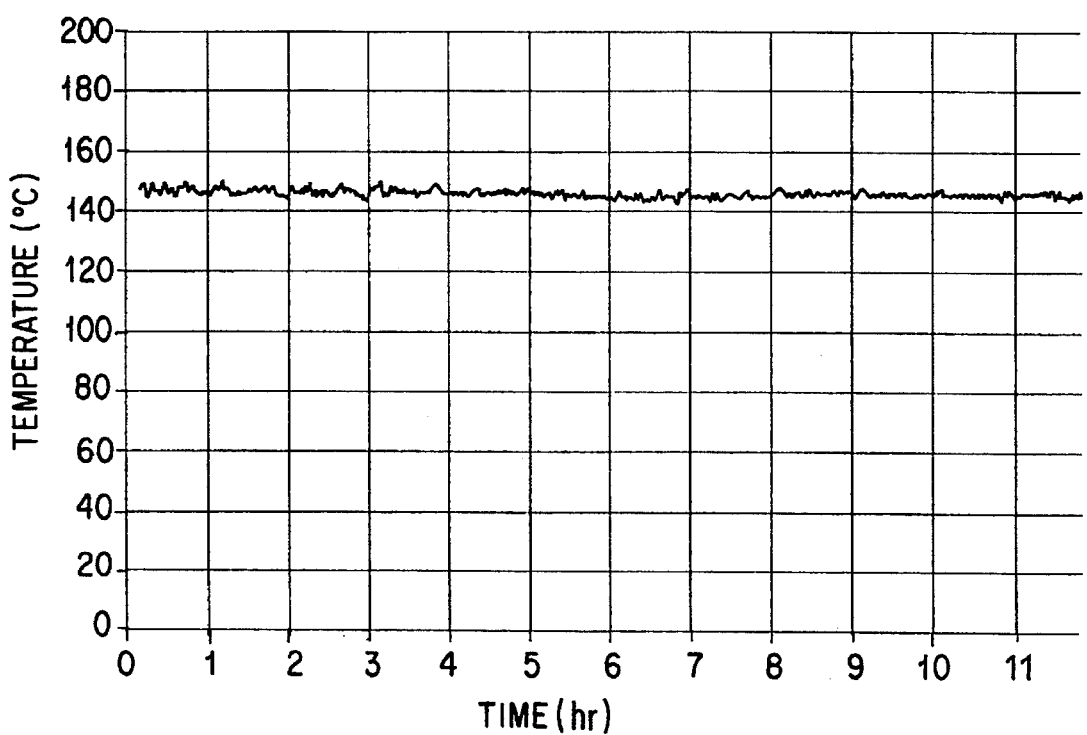
FIG. 9 is a graph showing the change in temperature of the raceway of a prior art roller bearing.

In order to confirm the effect of this feature of invention, the results of the test performed by the inventor is explained using FIGS. 7 thru 9, and Table 1 as references.

FIG. 7 shows the apparatus used in the test. A hollow fixed shaft 6 is placed between and supported by a pair of concentric holders 5a and 5b that have been axially spaced apart. Lubrication oil is supplied to the inside of the fixed shaft 6 from the holder 5b, and this lubrication oil passes through a discharge hole 7 and discharged around the aforementioned fixed shaft 6. On the outer circumferential surface of this fixed shaft 6, the inner ring raceway 4 is formed.

An outer race or ring 8 is rotatably supported around the fixed shaft 6 in a concentric relationship with the fixed shaft 6. Specifically, a plurality of rollers 1 are rotatably located between the outer raceway 9 formed on the inside circumferential surface of the outer race or ring 8, and the aforementioned inner ring raceway 4, so that the outer race or ring 8 is rotatably supported around the fixed shaft 6. There is no retainer (or referred to as "cage") for holding the rollers 1.

A follower gear 10 is installed around the outer circumferential surface of one axial end of the outer race or ring 8 (the right end in FIG. 7), and by gearing the follower gear 10 with a drive gear 12 that is driven by a motor 11, the outer race or ring 8 is caused to rotate at 16,000 rpm. Also, a support ring 14 is placed around the outer race or ring 8 using a pair of angular ball bearings 13 in a back-to-back arrangement. A 2500N radial force and a 14 N·m moment is applied to this support ring 14.

Using the test apparatus mentioned above, as both of the surface roughness of the inner ring raceway 4 around the outer circumferential surface of the fixed shaft 6, and the surface roughness of the rolling surfaces 2 of the rollers 1 were changed, the temperature of the inner ring raceway 4 was measured, and the results were recorded in Table 1. The values of the surface roughness shown in Table 1 are the average centerline roughness as prescribed by the standards given in JIS B 0601.

As can be clearly seen from the results in Table 1, it is possible to keep the rise in temperature of the inner ring raceway 4 of the roller bearing of this embodiment is at a lower level than that of the prior art roller bearings. Further, in the case of the roller bearing of this embodiment, the change in temperature of the inner raceway 4 was very small, as shown in FIG. 8. On the contrary, in the case of the prior art roller bearings, the change in temperature of the inner ring raceway 4 was large, as shown in FIG. 9.

TABLE 1

| Test No. | Surface Roughness of Roller | | Surface Roughness of Inner Ring Raceway (µm Ra) | | | Temperature of Inner Ring Raceway (°C.) |
| --- | --- | --- | --- | --- | --- | --- |
| | axial direction | circumferential direction | axial direction | circumferential | axial/ Circumferential | |
| Test No. 1 to No. 10: Embodiments of the present invention | | | | | | |
| 1 | 0.05 | 0.04 | 0.10 | 0.04 | 2.5 | 125 |
| 2 | 0.04 | 0.04 | 0.09 | 0.03 | 3.0 | 124 |
| 3 | 0.05 | 0.05 | 0.14 | 0.04 | 3.5 | 122 |
| 4 | 0.06 | 0.03 | 0.09 | 0.03 | 3.0 | 125 |
| 5 | 0.04 | 0.05 | 0.12 | 0.04 | 3.0 | 127 |
| 6 | 0.06 | 0.04 | 0.10 | 0.03 | 3.3 | 123 |
| 7 | 0.05 | 0.05 | 0.11 | 0.04 | 2.8 | 126 |
| 8 | 0.04 | 0.04 | 0.08 | 0.02 | 4.0 | 120 |
| 9 | 0.05 | 0.03 | 0.15 | 0.04 | 3.8 | 128 |
| 10 | 0.06 | 0.06 | 0.13 | 0.04 | 3.3 | 125 |
| Test No. 11 to No. 15: Comparison Examples | | | | | | |
| 11 | 0.06 | 0.06 | 0.04 | 0.04 | 1.0 | 148 |
| 12 | 0.05 | 0.04 | 0.04 | 0.03 | 1.3 | 150 |
| 13 | 0.05 | 0.04 | 0.03 | 0.03 | 1.0 | 150 |
| 14 | 0.06 | 0.03 | 0.10 | 0.09 | 1.1 | 142 |
| 15 | 0.04 | 0.04 | 0.12 | 0.08 | 1.5 | 140 |

Figure 10:
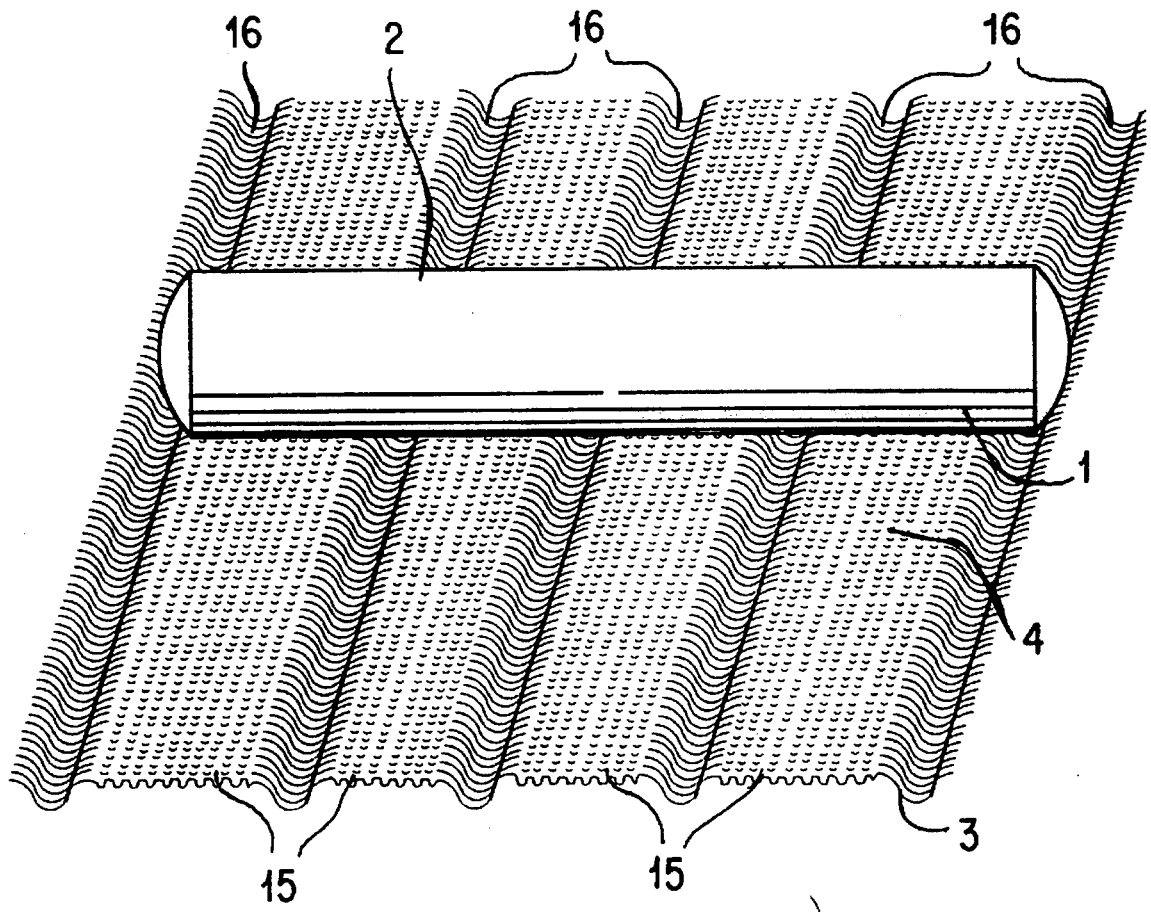
FIG. 10 is a pictorial view showing another embodiment of the roller bearing of the invention.

Now the roller bearing of this invention in another feature is explained using FIG. 10. In this embodiment as a lot of lubricant flow passages are formed along the circumferential direction on the peripheral surfaces of the mating parts, even if heat is generated due to the skew of the rollers, the substantial part of the heat generated is discharged by the lubricant oil through the many passages. Consequently, the temperature is prevented from rising on the peripheral surfaces (raceways) of the mating parts, improving the anti-seizure property.

In FIG. 10, the roller bearing is comprised of a plurality of rollers 1 each having a rolling surface (only one roller is illustrated) and an inner race or ring 3 having an inner raceway 4 on its outer circumferential surface and constructed such that the contact condition between the rolling surfaces 2 and the inner raceway 4 is tailored to prevent the temperature of the inner race or ring 3 from being raised when the rollers are skewed.

In the roller bearing of this embodiment as is clearly shown in FIG. 10, the surface roughness of the inner raceway 4 is comparatively coarser (0.08 µm Ra to 0.15 µm Ra) along the axial direction (left to right in FIG. 10).

In addition, the bearing ratio is 70% or more at 50% of the depth of roughness from the crest of surface roughness. Specifically, as in FIG. 10, the surface of the inner raceway 4 is formed with a plurality of relatively flat ridge sections 15 and a plurality of groove sections 16 which are alternatively repeated. In this surface condition, although the roughness is relatively coarse, there are a lot of groove sections 16 on the inner ring raceway 4 with a relatively fine pitch due to the larger bearing load ratio as mentioned previously. When the rollers 1 are skewed, heat is generated by strong friction forces between the rolling surfaces 2 and the inner ring raceway 4. The substantial amount of heat generated is discharged by the lubricant oil flowing in the circumferential direction through the many groove sections 16. Consequently, the temperatures in the inner ring raceway 4 and in the rolling surfaces opposed to the raceway 4 are prevented from rising, so that no seizure is caused between the inner ring raceway 4 and the rolling surfaces 2.

In addition, because of the larger bearing load ratio as mentioned above, no excessive surface pressure is caused in the contact areas between the inner ring raceway 4 and the rolling surfaces 2, so that flaws such as peeling are prevented from being produced on the inner ring raceway 4 and/or the rolling surfaces 2.

TABLE 2

| Test No. | Surface Roughness of Rollers | | Surface Roughness of Inner Ring (µm Ra) | | Temperature of Inner Ring (°C.) |
| --- | --- | --- | --- | --- | --- |
| | Axial | Circumferential | Axial | Bearing Load Ratio | |
| Test No. 21 of No. 30: Embodiments of the present invention | | | | | |
| 21 | 0.05 | 0.04 | 0.10 | 72 | 115 |
| 22 | 0.06 | 0.03 | 0.14 | 89 | 112 |
| 23 | 0.05 | 0.05 | 0.09 | 81 | 114 |
| 24 | 0.04 | 0.05 | 0.13 | 96 | 108 |
| 25 | 0.04 | 0.04 | 0.12 | 78 | 110 |
| 26 | 0.06 | 0.05 | 0.08 | 95 | 113 |
| 27 | 0.05 | 0.04 | 0.11 | 85 | 109 |
| 28 | 0.04 | 0.03 | 0.10 | 87 | 110 |
| 29 | 0.04 | 0.05 | 0.08 | 75 | 118 |
| 30 | 0.06 | 0.06 | 0.15 | 93 | 112 |

TABLE 2-continued

| Test No. | Surface Roughness of Rollers | | Surface Roughness of Inner Ring (μm Ra) | | Temperature of Inner Ring (°C.) |
|---|---|---|---|---|---|
| | Axial | Circumferential | Axial | Bearing Load Ratio | |
| Test No. 31 to No. 35: Comparison Examples | | | | | |
| 31 | 0.06 | 0.06 | 0.04 | 92 | 148 |
| 32 | 0.05 | 0.04 | 0.04 | 85 | 150 |
| 33 | 0.05 | 0.05 | 0.03 | 79 | 150 |
| 34 | 0.06 | 0.03 | 0.10 | 66 | 142 |
| 35 | 0.04 | 0.04 | 0.12 | 64 | 140 |

Figure 11:
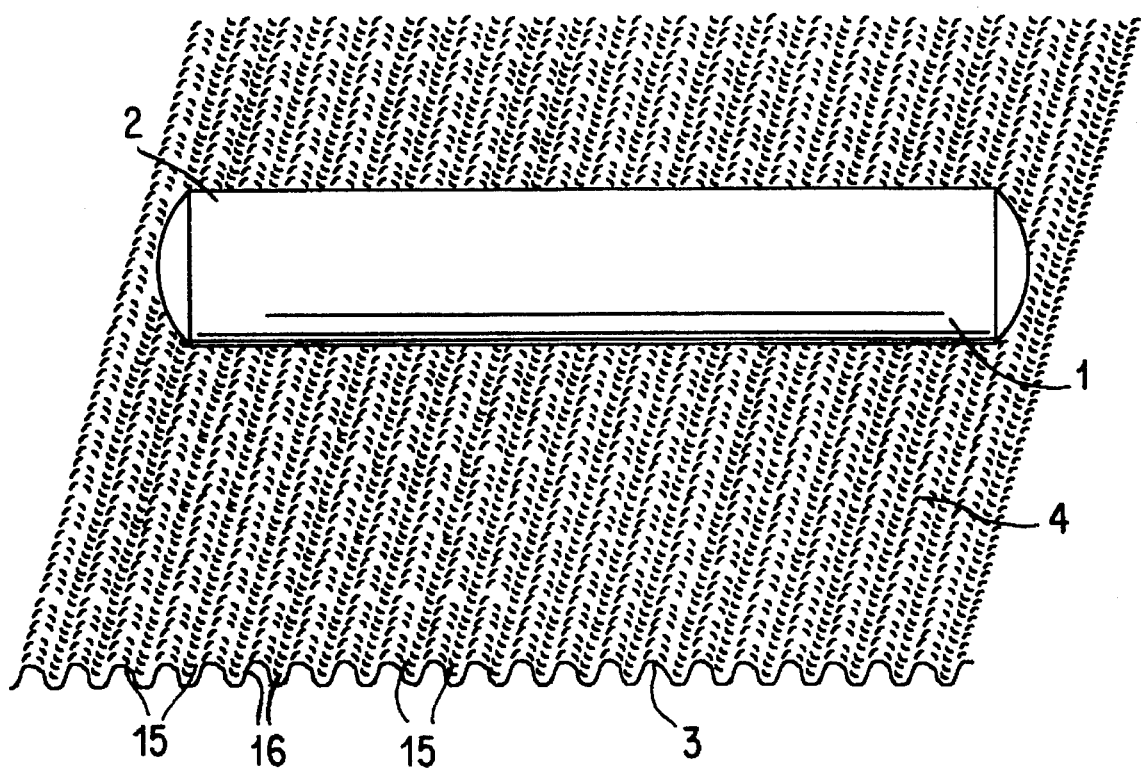
FIG. 11 is a pictorial view showing another prior art roller bearing.

FIG. 11 shows a prior art structure having a surface condition in a relatively smooth surface roughness less than 0.08 μm Ra with the bearing ratio being less than 70% at 50% of the depth of roughness from the crest of surface roughness. In this surface condition, enough passages for lubricant oil are not obtained, so that it is hard to prevent the temperature rise during operation.

In the condition of insufficient load ratio, the surface roughness must be substantially coarse in order to establish enough passages for lubricant oil, resulting in that an excessive surface pressure is produced in the contact area of the inner ring raceway 4 and the rolling surfaces 2. This may lead to flaws such as peeling.

Figure 12:
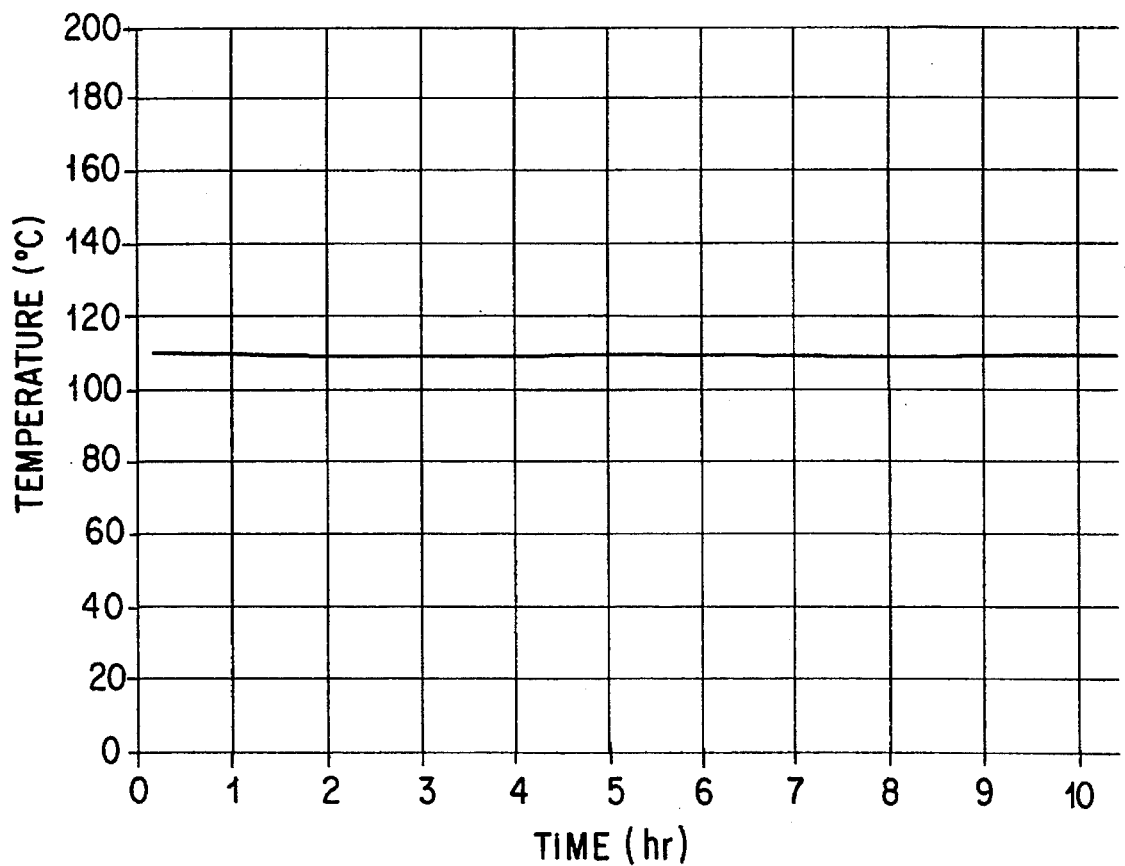
FIG. 12 is a graph showing the change in temperature of the raceway in another embodiment of he roller bearing of this invention.
Figure 13:
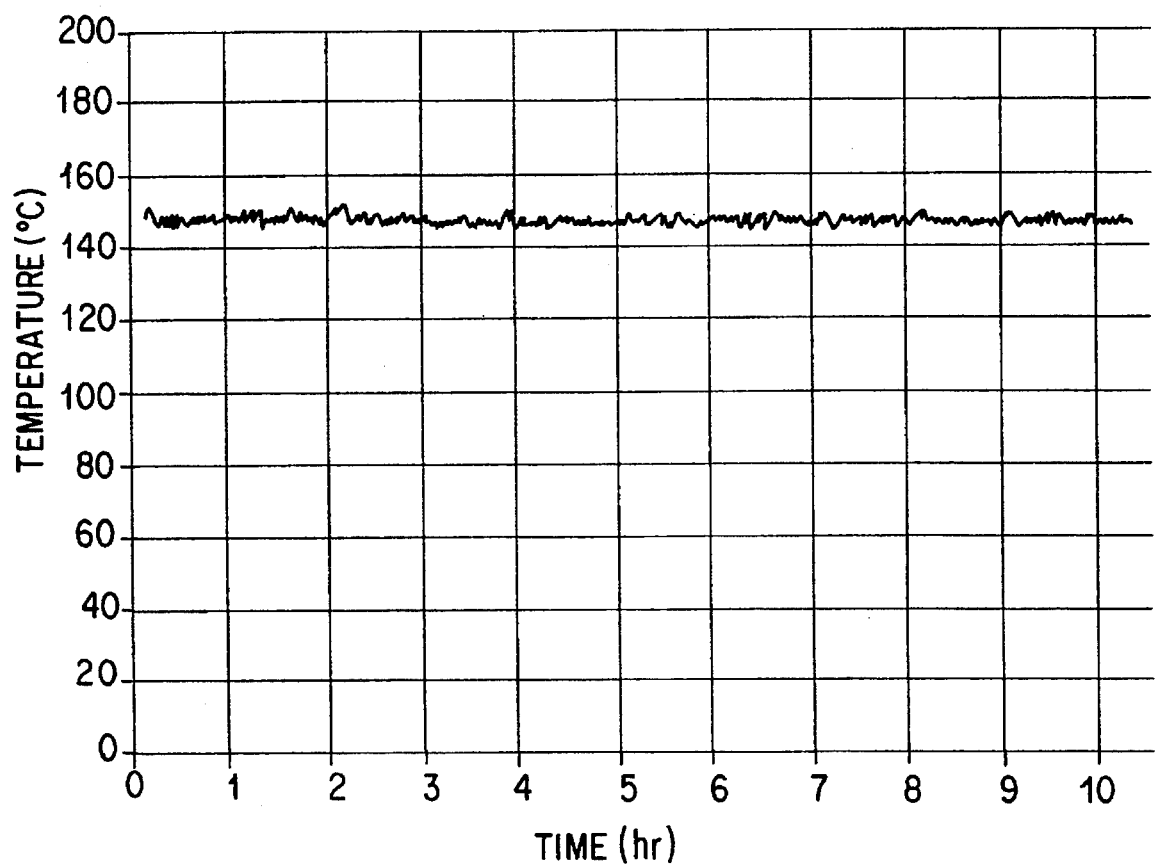
FIG. 13 is a graph showing the change in temperature of the raceway of another prior art roller bearing.

In order to confirm the effects in another feature of this invention, the results of the test performed by the inventor is explained using FIGS. 7, 12 and 13.

The test was achieved with the apparatus shown in FIG. 7 in the same manner as in the first feature of this invention.

Using the test apparatus mentioned above, as the surface roughness of the inner ring raceway 4 around the outer circumferential surface of the fixed shaft 6, and the surface roughness of the rolling surfaces 2 of the rollers 1 were changed, the temperature of the inner ring raceway 4 was measured, and the results were recorded in Table 2. The values of the surface roughness shown in Table 2 are the average centerline roughness as prescribed by the standards given in JIS B 0601.

As can be clearly seen from the results in Table 2, it is possible to keep the rise in temperature of the inner ring raceway 4 of the roller bearing of this embodiment is at a lower level than that of the prior art roller bearings. Further, in the case of the roller bearing of this embodiment, the change in temperature of the inner raceway 4 was very small, as shown in FIG. 12. On the contrary, in the case of the prior art roller bearings, the change in temperature of the inner ring raceway 4 was large, as shown in FIG. 13.

Incidentally, a grinding stone with suitable grain and binder is used to process the surfaces of the component parts to a desired condition, using a processing method such as center less processing. For example, by using a grinding stone made of a glazed alumina grain and resin binder, and setting the feeding speed of the material to be processed at a suitable speed, it is possible to obtain a part having the desired surface condition.

The roller bearing of this invention is constructed and used as described above, and so the amount of heat generated by the roller bearing is held to a minimum, making it possible to reduce the danger of seizure in the roller bearing.

What is claimed is:

1. A roller bearing comprising a plurality of rollers, each having an outer circumferential surface on which a rolling surface is formed, and mating parts each having a circumferential surface on which a raceway is formed to come into contact with the rolling surfaces of the rollers, the surface roughness of the rolling surfaces being 0.06 μm Ra or less in both the axial and circumferential directions, and the surface roughness of the mating parts being 0.08 to 0.15 μm Ra along the axial direction, and 0.04 μm Ra or less along the circumferential direction.

2. A roller bearing comprising a plurality of rollers, each having an outer circumferential surface on which a rolling surface is formed, and mating parts each having a circumferential surface on which a raceway is formed to come into contact with the rolling surfaces of the rollers, the surface roughness of the rolling surfaces being 0.06 μm Ra or less in both the axial and circumferential directions, and the surface roughness of the mating parts being 0.08 to 0.15 μm Ra along the axial direction, and the bearing ratio being at least 70% at 50% of the depth of surface roughness from the crest of surface roughness with reference to the axial direction in the mating parts.

3. A roller bearing comprising a plurality of rollers, each having an outer circumferential surface on which a rolling surface is formed, and mating parts each having a circumferential surface on which a raceway is formed to come into contact with the rolling surfaces of the rollers, the surface roughness of the rolling surfaces being 0.06 μm Ra or less in both the axial and circumferential directions; the surface roughness of the mating parts being 0.08 to 0.15 μm Ra along the axial direction, and 0.04 μm Ra or less along the circumferential direction, and the the bearing ratio being at least 70% at 50% of the depth of surface roughness from the crest of surface roughness with reference to the axial direction in the mating parts.

* * * * *